H. WAKEMAN.
Armor for Flexible Tubing.
No. 203,094. Patented April 30, 1878.
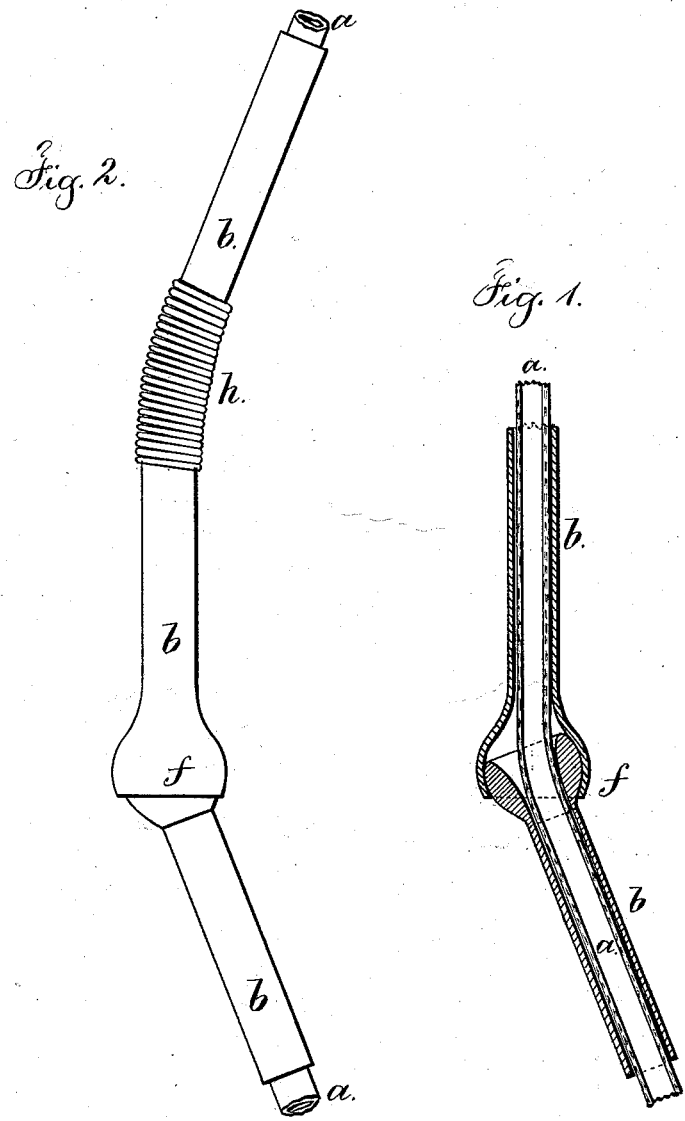

UNITED STATES PATENT OFFICE.

HARWOOD WAKEMAN, OF NEW YORK, N. Y.

IMPROVEMENT IN ARMOR FOR FLEXIBLE TUBING.

Specification forming part of Letters Patent No. 203,094, dated April 30, 1878; application filed April 8, 1878.

*To all whom it may concern:*

Be it known that I, HARWOOD WAKEMAN, of the city and State of New York, have invented an Improvement in Armor for Flexible Tubing, of which the following is a specification:

Flexible tubing employed for connecting the air-brake pipes upon railway-cars, and for conveying steam and other fluids to rock-drills and other implements employed in mining and engineering operations, has been protected by metallic armor, and I have heretofore obtained various Letters Patent relating to the same.

The nature of my present invention consists in the combination, with the flexible tube, of an armor composed of metallic tubes joined together in lengths, so as to be capable of easy movement from place to place, the tubes either being in line or occupying a zigzag position.

By this improvement the tube of flexible material can be completely incased in metal, and the metal will strengthen the flexible tube by surrounding it, and the flexible tube will prevent leakage at the joints of the armor-tubes.

In the drawing, Figure 1 is a longitudinal section of the flexible tube and armor, and Fig. 2 is an elevation representing two joints.

The flexible tube *a* is of india-rubber or similar material, of any desired size and thickness. The metallic tubes *b* are of a size to fit the outside of the flexible tube with moderate closeness, and these tubes *b* are of the required thickness to obtain the necessary strength, and of a length suitable to the use to which the flexible tube is to be applied. These metal tubes *b* are joined together with flexible metallic connections, that allow the lengths of metallic armor-tubing to occupy inclined or zigzag positions to each other, or the tubes to be drawn all into a straight line.

I have shown two differently-constructed joints for the metallic armor-tubes. At *f* the end of one tube is provided with a spheroidal segment, entering a similarly-shaped segment at the end of the next metallic armor-tube, and thereby forming a ball-and-socket tubular joint; and at *h* the joint between the tubes is represented as a closely-wound helix of wire, the end portions of which are soldered or otherwise connected to the ends of the respective tubular armor-sections, so as to yield as the tubes *b* are moved, and at the same time sustain the flexible tube under internal pressure, preserve its circular sectional form, and protect it from external injury.

I claim as my invention—

The metallic tubular armor-sections, connected together by flexible joints, and applied to and combined with a flexible internal tube, substantially as and for the purposes set forth.

Signed by me this 4th day of April, A. D. 1878.

HARWOOD WAKEMAN.

Witnesses:
 GEO. T. PINCKNEY,
 CHAS. H. SMITH.